United States Patent [19]

An

[11] Patent Number: 5,959,999
[45] Date of Patent: Sep. 28, 1999

[54] PROVIDING CONTROL-FUNCTION DATA IN COMMUNICATION-DATA CHANNEL OF A FULL-MESH SATELLITE COMMUNICATION NETWORK BY DYNAMIC TIME-SLOT ASSIGNMENT IN TDMA-FRAME COMMUNICATION CHANNEL

[75] Inventor: Song Howard An, San Diego, Calif.

[73] Assignee: Linkabit Wireless, Inc., San Diego, Calif.

[21] Appl. No.: 08/716,966

[22] Filed: Sep. 20, 1996

[51] Int. Cl.$^6$ ........................................ H04J 3/16
[52] U.S. Cl. ........................................ 370/442
[58] Field of Search ........................... 370/310, 312, 370/314, 319, 321, 324, 337, 341, 347, 349, 329, 336, 338, 346, 350, 442, 461

[56] References Cited

U.S. PATENT DOCUMENTS

| | | | |
|---|---|---|---|
| 4,330,857 | 5/1982 | Alvarez et al. | 370/321 |
| 5,521,925 | 5/1996 | Mekakos et al. | 370/337 |
| 5,606,551 | 2/1997 | Kartalopoulos | 370/406 |
| 5,628,052 | 5/1997 | DeSantis et al. | 370/334 |
| 5,757,784 | 5/1998 | Liebowitz et al. | 370/321 |

OTHER PUBLICATIONS

Heegard et al., "A Microprocessor–Based PSK Modem for Pocket transmission Over Satellite Channels", IEEE Trans.on Communications, May 1978, pp. 552–564.

Meyer et al., "Phase Acquisition Statistics for Phase–Locked Loops", IEEE Trans.on communications, Aug. 1980, pp. 1365–1372.

An, "On The Channel Control Modem For DAMA Applications" Proceedings of IEEE MILCOM, 1995.

*Primary Examiner*—Dang Ton
*Attorney, Agent, or Firm*—Edward W. Callan

[57] ABSTRACT

In a communication system including a plurality of user terminals in a full-mesh network and a network-control-station terminal, control-function data is communicated between an individual user terminal and the network-control-station terminal in a given TDMA-frame communication channel while the given TDMA-frame communication channel is also being used for communicating user-communication data between user terminals. The control-function data and the user-communication data are communicated within control-function time slots and user-communication time slots respectively of the given TDMA-frame communication channel. The time slots for such communications are dynamically assigned in response to time-slot assignment signals communicated from the network-control-station terminal when the communication link between the user terminals is established. Control-function data is communicated from the user terminals to the network-control-station terminal in even-numbered control-function time slots of different given TDMA-frame communication channels; and control-function data is communicated from the network-control-station to the user terminals in odd-numbered control-function time slots of different given TDMA-frame communication channels.

20 Claims, 2 Drawing Sheets

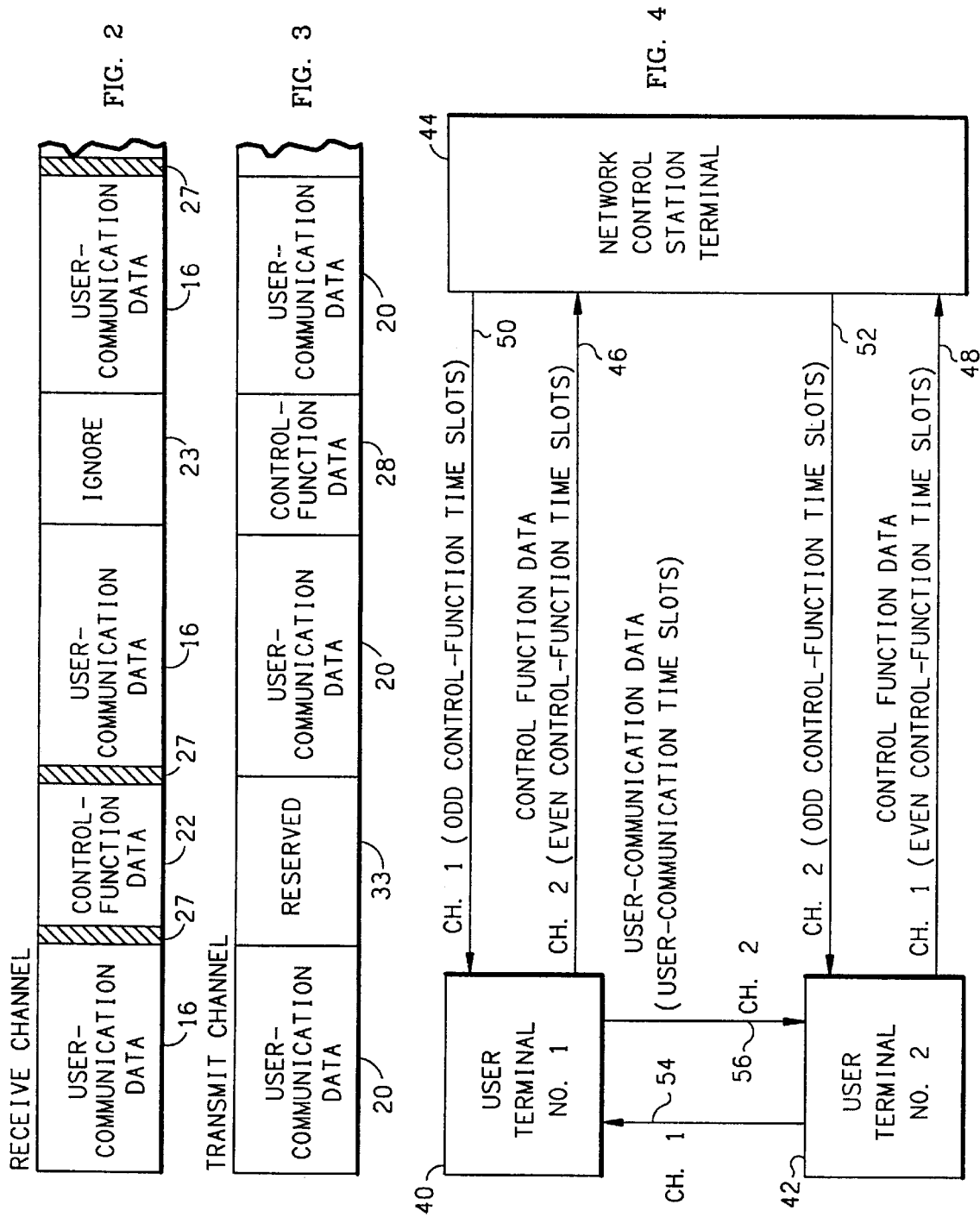

PROVIDING CONTROL-FUNCTION DATA IN COMMUNICATION-DATA CHANNEL OF A FULL-MESH SATELLITE COMMUNICATION NETWORK BY DYNAMIC TIME-SLOT ASSIGNMENT IN TDMA-FRAME COMMUNICATION CHANNEL

BACKGROUND OF THE INVENTION

The present invention generally pertains to communication networks and methods and is particularly directed to communication of control-function data to and from a plurality of user terminals in a full-mesh communication network.

In a communication network, such as a satellite communication network, it is desirable to communicate control-function data between a network control station and the user terminals while user-communication data is being communicated between the user terminals. User-communication data is data that users transmit to one another, such as audio, video, facsimile images, and data-processing data other than such as is used for network control functions. Control-function data includes data for performing network monitor and control functions and for providing the user terminals with command and control capability. The control functions include priority management and automatic power-level control. For example, the network control station should have the capability of being able to alter the communication network in accordance with the relative priority of user requests for different available communication channels in the network. Also, the network control station should have the capability of being able to probe any user terminal for the user-terminal operating status for the purpose of network management and the capability of being able to command the user terminals to adjust the power level to optimize the use of a satellite transponder when the network is a satellite communication network.

In a "star" type of communication network, in which communications between the user terminals are passed through a network-control-station terminal at the hub of the star network, the control-function data can be multiplexed with the user communication data in a common communication channel. However, in a full mesh communication network, in which there is no central hub for passing communications between the user terminals, the multiplexing scheme is not feasible because the communication channels dedicated to communicating user-communication data communicate the user-communication data directly between the user terminals. Thus, in a full-mesh network, an additional communication channel has been required for communicating control-function data between a network control station and a user terminal while the user terminal is communicating user-communication data directly to and from another user terminal over the dedicated communication channels. The use of an additional channel adds to the complexity and cost of each user terminal and reduces the number of channels available in the overall network bandwidth for communication of user-communication data, and thereby limits the applicability of a full-mesh network for satellite communications.

SUMMARY OF THE INVENTION

The present invention enables a user terminal in a full-mesh communication network to communicate control-function data with a network-control-station terminal over a given communication channel while the given control channel is being used for communicating user-communication data directly between user terminals and thereby obviates the necessity of providing an additional communication channel for communicating control-function data between a user terminal and the network-control-station terminal.

The present invention provides a communication system including a plurality of user terminals in a full mesh network; a network-control-station terminal; first means for causing control-function data to be communicated between the network-control-station terminal and a first user terminal within control-function time slots of a given TDMA-frame communication channel; and second means for causing user-communication data to be communicated between the first user terminal and a second user terminal within user-communication time slots of the given TDMA-frame communication channel.

The present invention also provides a method of communicating within a communication system that includes a plurality of user terminals in a full-mesh network and a network-control-station terminal, the method comprising the steps of:

(a) communicating control-function data between the network-control-station terminal and a first user terminal within control-function time slots of a given TDMA-frame communication channel; and (b) communicating user-communication data between the first user terminal and a second user terminal within user-communication time slots of the given TDMA-frame communication channel.

The present invention further provides a user communication terminal, comprising first means for processing control-function data and user-communication data provided within control-function time slots and user-communication time slots respectively of a given TDMA-frame communication channel; and second means for dynamically assigning the control-function time slots and the user-communication time slots within the TDMA-frame communication channel in response to a received time-slot assignment signal; wherein the first means is adapted for processing user-communication data received within user-communication time slots of one said TDMA-frame communication channel and for processing user-communication data for transmission within user-communication time slots of another said TDMA-frame communication channel; and wherein the second means is adapted for assigning odd-numbered control-function time slots of the one said TDMA-frame communication channel for receipt of control-function data in response to a first said time-slot assignment signal and for assigning even-numbered control-function time slots of the other said TDMA-frame communication channel for transmission of control-function data in response to a second said time-slot assignment signal.

Additional features of the present invention are described with reference to the detailed description of the preferred embodiments.

BRIEF DESCRIPTION OF THE DRAWING

FIG. 2 is a diagram of the receive-channel TDMA-frame for the communication terminal of FIG. 1.

FIG. 3 is a diagram of the transmit-channel TDMA-frame for the communication terminal of FIG. 1.

FIG. 4 is a block diagram of an embodiment of a full-mesh communication system according to the present invention, including as the user terminals the communication terminal of FIG. 1.

DETAILED DESCRIPTION

Figure 1:
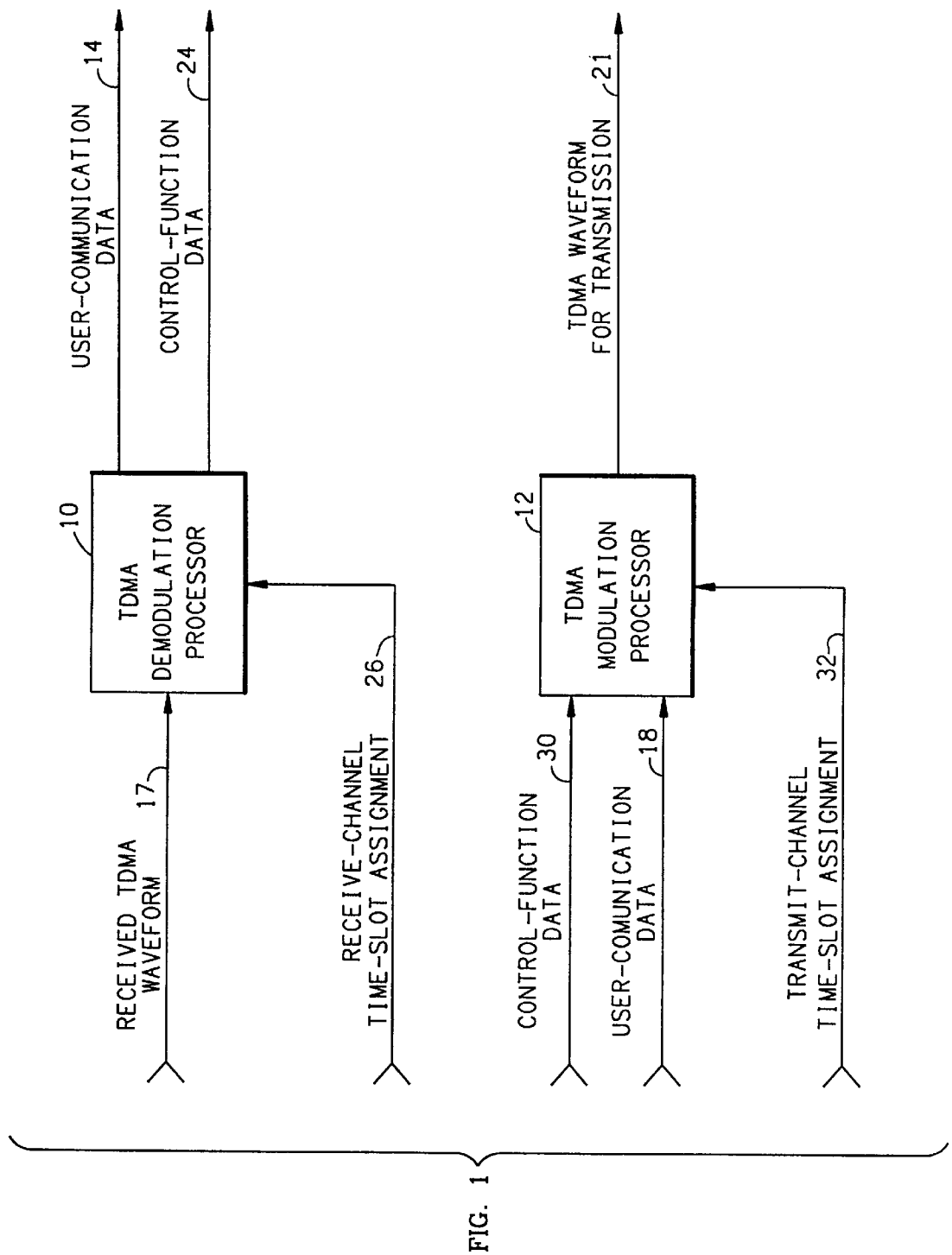
FIG. 1 is a block diagram of the essential portions of a communication terminal according to the present invention.

Referring to FIG. 1, a preferred embodiment of a user communication terminal according to the present invention includes a TDMA demodulation processor 10 and a TDMA modulation processor 12. Preferably, the processors 10, 12 are microprocessors.

The TDMA demodulation processor 10 is adapted for processing user-communication data 14 received within user-communication time slots 16 of a first given TDMA-frame communication channel 17, as shown in FIG. 2; and the TDMA modulation processor 12 is adapted for processing user-communication data 18 for transmission within user-communication time slots 20 of a second given TDMA-frame communication channel 21, as shown in FIG. 3.

The TDMA demodulation processor 10 is adapted for dynamically assigning odd-numbered control-function time slots 22 of the first given TDMA-frame communication channel 17 for receipt of control-function data 24 in response to a receive-channel timeslot assignment signal 26 that is received from a network control station when a communication link is established between the user communication terminal and another user communication terminal. The receive-channel time-slot assignment signal 26 defines the respective duty cycles of the odd-numbered control-function time slots 22, the even-numbered control function time slots 23 and the user-communication time slots 16 of the first given TDMA-frame communication channel 17 as well as guard times 27 preceding and following the odd-numbered control-function time slots 22. The TDMA demodulation processor 10 is further adapted for separately acquiring the control-function data 24 from the odd-numbered control-function time slots 22 and user-communication data 14 from the user-communication time slots 16 respectively of the first given TDMA-frame communication channel 17. Since the user-communication data 14 acquired by the TDMA demodulation processor 10 is received from another user communication terminal and the control function data 24 acquired by the TDMA demodulation processor 10 is received from a network control station terminal, the signals respectively carrying the user-communication data 14 and the control function data 24 do not maintain coherency and thus must be demodulated independently. The TDMA demodulation processor 10 is also adapted for ignoring whatever is received in the even-numbered control-function time slots 23.

The TDMA modulation processor 12 is adapted and for dynamically assigning even-numbered control-function time slots 28 of the second given TDMA-frame communication channel 21 for transmission of control-function data 30 in response to a transmit-channel time-slot assignment signal 32 that is received from the network control station when the communication link is established between the user communication terminal and the other user communication terminal. The transmit-channel time-slot assignment signal 32 defines the respective duty cycles of the even-numbered control-function time slots 28, the odd-numbered control function time slots 33 and the user-communication time slots 20 of the second given TDMA-frame communication channel 21. The TDMA modulation processor 12 is further adapted for processing the control-function data 30 for transmission within the even-numbered control-function time slots 28 of the second given TDMA-frame communication channel 21. The odd-numbered control function time slots 33 of the second given TDMA-frame communication channel 21 are reserved for communication of control-function data by the network-control station terminal to the other user communication terminal to which the user-communication data 18 is communicated in the user-communication time slots 20 of the second given TDMA-frame communication channel 21. The user communication terminal of FIG. 1 does not transmit any signal in the second given communication channel during the reserved odd-numbered time slots 33 of the second given TDMA-frame communication channel 21.

Referring to FIG. 4, a preferred embodiment of a full-mesh communication network according to the present invention includes a first user terminal 40, a second user terminal 42 and a network-control-station terminal 44. Each user terminal 40, 42 is a user communication terminal as described above with reference to FIGS. 1, 2 and 3.

Time slots in both a first given communication channel (CH. 1) and a second given communication channel (CH. 2) are dynamically assigned in response to time-slot assignment signals 26, 32 communicated respectively to the TDMA demodulation processor 10 of the first user terminal 40 and the TDMA demodulation processor 10 of the second user terminal 42 from the network-control-station terminal 44 when the communication link is established between the first user terminal 40 and the second user terminal 42. Even-numbered control-function time slots 28 of different given TDMA-frame communication channels are assigned for transmission of control-function data 46, 48 from the user terminals 40, 42 to the network-control-station terminal 44; and odd-numbered control-function time slots 22 of the the different given TDMA-frame communication channels are assigned for transmission of control-function data 50, 52 to the user terminals 40, 42 from the network-control-station terminal 44. The time-slot assignment signals 26, 32 define the respective duty cycles of the control-function time slots 22, 28 and the user-communication time slots 16, 20 in the first given communication channel and the second given communication channel. The duty cycles of the control-function time slots 22, 28 are determined primarily by the relative priority of the communication between the first user terminal 40 and the second user terminal 42; and these duty cycles may vary every time such a communication link is established.

User-communication data 54 is communicated from the TDMA modulation processor 12 of the second user terminal 42 to the TDMA demodulation processor 10 of the first user terminal 40 in user-communication time slots 20/16 of one TDMA-frame communication channel CH. 1; and user-communication data 56 is communicated from the TDMA modulation processor 12 of the first user terminal 40 to the TDMA demodulation processor 10 of the second user terminal 42 in user-communication time slots 20/16 of another TDMA-frame communication channel CH. 2.

Control-function data 50 is communicated from the network-control-station terminal 44 to the TDMA demodulation processor 10 of the first user terminal 40 within odd control-function time slots 22 of the one TDMA-frame communication channel CH. 1 and control-function data 52 is communicated from the network-control-station terminal 44 to the TDMA demodulation processor 10 of the second user terminal 42 within odd control-function time slots 22 of the other TDMA-frame communication channel CH. 2.

Control-function data 46 is communicated to the network-control-station terminal 44 from the TDMA modulation processor 12 of the first user terminal 40 within even control-function time slots 28 of the other TDMA-frame communication channel CH. 2; and control-function data 48 is communicated to the network-control-station terminal 44 from the TDMA modulation processor 12 of the second user terminal 42 within even control-function time slots 28 of the one TDMA-frame communication channel CH. 1.

A consequence of the above-described time-slot assignment scheme is that the network-control-station terminal 44 may communicate with any user terminal 40, 42 at its own pace. When the network-control-station terminal 44 needs to transmit control-function data to any user terminal 40, 42, the network-control-station terminal 44 monitors the given communication channel over which the control-function data is to be sent in order to acquire the signal frequency and the starting time of the odd-numbered control-function time slot 22 before transmitting the control-function data 24. The receiving user terminal 40, 42 always monitors both the user-communication time slots 16 and the odd-numbered control-function time slots 22 so as to be able to acquire both the user-communication data 14 and the control-function data 24 quickly and reliably.

Signal burst acquisition technology is used by the user communication terminals 40, 42 for quickly acquiring the user-communication data 16 and the control function data 22 from the received TDMA-frame communication channel 17. Such technology is described in applicant's U.S. Pat. No. 5,544,200; C. Heegard, J. A. Heller and A. J. Viterbi, "A Microprocessor-Based PSK Modem for Packet Transmission Over Satellite Channels", IEEE Transactions on Communications, vol. COMM-26, No. 5, pp. 552–564, May 1978; H. Meyr and L. Popken, "Phase Acquisition statistics for Phase-Locked Loops", IEEE Transactions on Communications, vol. COMM-28, No. 8, pp. 1365–1372, August 1980; and S. An, "On The Channel Control Modem For DAMA Applications", Proceedings of IEEE MILCOM 1995. A known data pattern called a preamble is inserted in the TDMA-frame communication channel 17 preceding the user-communication data 16. A one-zero type of data pattern possessing full data transitions is preferred.

In the preferred embodiment of the full-mesh network of the present invention, the network-control-station terminal 44 always monitors the channel before it transmits any signal so that the frequency uncertainty can be assumed to be very minimal, typically less than 0.1% of the symbol rate. A BPSK signal, which provides the most efficient preamble waveform, can be represented as $$s(t) = A \sin(2\pi f_o t + \Theta(t) + \phi) \qquad \text{(Eq. 1)}$$

where A is the amplitude of the signal, $f_o$ is the carrier frequency, $\Theta(t)$ is the modulating phase either 0 or $\pi$, and $\phi$ is the carrier phase uniformly distributed between $-\pi$ and $\pi$. The carrier frequency, phase, and symbol timing must be known before the receiver can coherently demodulate the signal.

One key to fast acquisition is to use the same data to estimate the carrier frequency, phase, and symbol timing if possible. However, this may be costly to implement. Because the network-control-station terminal 44 monitors the given communication channel over which the control-function data 24 is to be sent in order to acquire the signal frequency before transmitting the control-function data 24, as described above, it is quite common to obtain frequency accuracy within 0.1% of the symbol rate. In view of such accuracy, the frequency acquisition function may be omitted in the user terminals 40, 42, which thereby allows a shorter preamble length in the waveform design.

The full-mesh communication network and method of the present invention are particularly well suited for such applications as rural telephone communications and video conferencing.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

I claim:

1. A communication system including
   a plurality of user terminals in a full mesh network;
   a network-control-station terminal;
   first means for causing control-function data to be communicated between the network-control-station terminal and a first user terminal within control-function time slots of a given TDMA-frame communication channel; and
   second means for causing user-communication data to be communicated between the first user terminal and a second user terminal within user-communication time slots of the given TDMA-frame communication channel.

2. A network according to claim 1, wherein the first means is adapted for causing control-function data to be communicated from the network-control-station terminal to the first user terminal within the control-function time slots of the given TDMA-frame communication channel; and
   wherein the second means is adapted for causing user-communication data to be communicated to the first user terminal from the second user terminal within the user-communication time slots of the given TDMA-frame communication channel.

3. A network according to claim 1, wherein the first means is adapted for causing control-function data to be communicated to the network-control-station terminal from the first user terminal within the control-function time slots of the given TDMA-frame communication channel; and
   wherein the second means is adapted for causing user-communication data to be communicated from the first user terminal to the second user terminal within the user-communication time slots of the given TDMA-frame communication channel.

4. A network according to claim 1, wherein respective user terminal further comprise
   third means for dynamically assigning the time slots for said communications in response to a time-slot assignment signal communicated from the network-control-station terminal.

5. A network according to claim 4, wherein even-numbered control-function time slots of different given TDMA-frame communication channels are assigned for transmission of control-function data from the user terminals to the network-control-station terminal and odd-numbered control-function time slots of the different given TDMA-frame communication channels are assigned for transmission of control-function data to the user terminals from the network-control-station terminal.

6. A network according to claim 4, wherein the time-slot assignment signal defines the respective duty cycles of the control-function time slots and the user-communication time slots.

7. A network according to claim 1, wherein the first means is adapted for causing control-function data to be communicated from the user terminals to the network-control-station terminal in even-numbered control-function time slots of different given TDMA-frame communication channels, and for causing control-function data to be communicated from the network-control-station to the user terminals in odd-numbered control-function time slots of the different given TDMA-frame communication channels.

8. A network according to claim 1, wherein the second means is adapted for communicating user-communication data from the second user terminal to the first user terminal in user-communication time slots of one said TDMA-frame communication channel, and for communicating user-communication data from the first user terminal to the second user terminal in user-communication time slots of another said TDMA-frame communication channel; and wherein the first means is adapted for communicating control-function data from the network-control-station terminal to the first user terminal within odd control-function time slots of the one said TDMA-frame communication channel, and for communicating control-function data from the network-control-station terminal to the second user terminal within odd control-function time slots of the other said TDMA-frame communication channel, for communicating control-function data to the network-control-station terminal from the first user terminal within even control-function time slots of the other said TDMA-frame communication channel, and for communicating control-function data to the network-control-station terminal from the second user terminal within even control-function time slots of the one said TDMA-frame communication channel.

9. A method of communicating within a communication system that includes a plurality of user terminals in a full-mesh network and a network-control-station terminal, the method comprising the steps of:

(a) communicating control-function data between the network-control-station terminal and a first user terminal within control-function time slots of a given TDMA-frame communication channel; and (b) communicating user-communication data between the first user terminal and a second user terminal within user-communication time slots of the given TDMA-frame communication channel.

10. A communication method according to claim 9, wherein step (a) comprises the step of:

(c) causing control-function data to be communicated from the network-control-station terminal to the first user terminal within the control-function time slots of the given TDMA-frame communication channel; and wherein step (b) comprises the step of:

(d) causing user-communication data to be communicated to the first user terminal from the second user terminal within the user-communication time slots of the given TDMA-frame communication channel.

11. A communication method according to claim 9, wherein step (a) comprises the step of:

(c) causing control-function data to be communicated to the network-control-station terminal from the first user terminal within the control-function time slots of the given TDMA-frame communication channel; and wherein step (b) comprises the step of:

(d) causing user-communication data to be communicated from the first user terminal to the second user terminal within the user-communication time slots of the given TDMA-frame communication channel.

12. A communication method according to claim 9, further comprising the step of:

(c) dynamically assigning the time slots for said communications in response to a time-slot assignment signal communicated from the network-control-station terminal.

13. A communication method according to claim 12, wherein step (c) comprises the steps of:

(d) assigning even-numbered control-function time slots of different given TDMA-frame communication channels for transmission of control-function data from the user terminals to the network-control-station terminal; and (e) assigning odd-numbered control-function time slots of the different given TDMA-frame communication channels for transmission of control-function data to the user terminals from the network-control-station terminal.

14. A communication method according to claim 12, wherein the time-slot assignment signal defines the respective duty cycles of the control-function time slots and the user-communication time slots.

15. A communication method according to claim 9, wherein step (a) comprises the steps of:

(c) communicating control-function data from the user terminals to the network-control-station terminal in even-numbered control-function time slots of different given TDMA-frame communication channels; and (d) communicating control-function data from the network-control-station to the user terminals in odd-numbered control-function time slots of the different given TDMA-frame communication channels.

16. A communication method according to claim 9, wherein step (b) comprises the steps of:

(c) communicating user-communication data from the second user terminal to the first user terminal in user-communication time slots of one said TDMA-frame communication channel; and (d) communicating user-communication data from the first user terminal to the second user terminal in user-communication time slots of another said TDMA-frame communication channel; and wherein step (a) comprises the steps of:

(e) communicating control-function data from the network-control-station terminal to the first user terminal within odd control-function time slots of the one said TDMA-frame communication channel;

(f) communicating control-function data from the network-control-station terminal to the second user terminal within odd control-function time slots of the other said TDMA-frame communication channel;

(g) communicating control-function data to the network-control-station terminal from the first user terminal within even control-function time slots of the other said TDMA-frame communication channel; and (h) communicating control-function data to the network-control-station terminal from the second user terminal within even control-function time slots of the one said TDMA-frame communication channel.

17. A user communication terminal, comprising first means for processing control-function data and user-communication data provided within control-function time slots and user-communication time slots respectively of a given TDMA-frame communication channel; and second means for dynamically assigning the control-function time slots and the user-communication time slots within the TDMA-frame communicated channel in response to a received time-slot assignment signal;

wherein the first means is adapted for processing user-communication data received within user-communication time slots of one said TDMA-frame communication channel and for processing user-communication data for transmission within user-communication time slots of another said TDMA-frame communication channel; and wherein the second means is adapted for assigning odd-numbered control-function time slots of the one said TDMA-frame communication channel for receipt of control-function data in response to a first said time-slot assignment signal and for assigning even-numbered control-function time slots of the other said TDMA-frame communication channel for transmission of control-function data in response to a second said time-slot assignment signal.

18. A communication terminal according to claim 17, wherein the first means is adapted for separately acquiring control-function data and user-communication data from the one said TDMA-frame communication channel.

19. A communication terminal according to claim 17, wherein the first means is further adapted for processing control-function data for transmission within the even-numbered control-function time slots of the other said TDMA-frame communication channel.

20. A communication terminal according to claim 17, wherein the time-slot assignment signal defines the respective duty cycles of the control-function time slots and the user-communication time slots.

* * * * *

UNITED STATES PATENT AND TRADEMARK OFFICE
CERTIFICATE OF CORRECTION

PATENT NO.    : 5,959,999
DATED         : September 28, 1999
INVENTOR(S)   : Song Howard An It is certified that error appears in the above-identified patent and that said Letters Patent is hereby corrected as shown below:

Column 2,
Line 2, delete "directly".

Column 5,
Line 48, should read -- $s(t) = A \sin(2\pi f_0 t + \Theta(t) + \phi)$            (Eq. 1) --.

Signed and Sealed this

Ninth Day of April, 2002

Attest:

JAMES E. ROGAN
Attesting Officer    Director of the United States Patent and Trademark Office